United States Patent
Holland (10) Patent No.: US 6,852,235 B2
(45) Date of Patent: Feb. 8, 2005

(54) METHOD AND APPARATUS FOR PREVENTING SCALE DEPOSITS AND REMOVING CONTAMINANTS FROM FLUID COLUMNS

(76) Inventor: Herbert W. Holland, 2314 Chimney Rock Rd., Houston, TX (US) 77056

( * ) Notice: Subject to any disclaimer, the term of this patent is extended or adjusted under 35 U.S.C. 154(b) by 0 days.

(21) Appl. No.: 10/731,398

(22) Filed: Dec. 10, 2003

(65) Prior Publication Data

US 2004/0112408 A1 Jun. 17, 2004

Related U.S. Application Data

(63) Continuation of application No. 10/372,731, filed on Feb. 23, 2002, now Pat. No. 6,706,196.

(51) Int. Cl.[7] ............................ B01D 35/06; C02F 1/48
(52) U.S. Cl. ................. 210/695; 210/748; 210/222; 210/243; 204/155; 204/554; 204/557; 204/660; 204/664; 166/66.5
(58) Field of Search ................................. 210/695, 748, 210/222, 243; 204/155, 554, 557, 660, 664; 166/66.5

(56) References Cited

U.S. PATENT DOCUMENTS

| 2,652,925 | A | * | 9/1953 | Vermeiren | ................... 210/222 |
| 4,938,875 | A | * | 7/1990 | Niessen | ........................ 210/695 |
| 4,954,263 | A | * | 9/1990 | Woodhouse | ................ 210/695 |
| 5,074,998 | A | * | 12/1991 | De Baat Doelman | ....... 210/222 |

* cited by examiner

Primary Examiner—David A. Reifsnyder (57) ABSTRACT

A method and apparatus provide fluid treatment at a plurality of distinct points using a length of energized magnetically conductive conduit in fluid communication with non-magnetic coupling devices. The instant invention prevents the formation and accumulation of contaminants within conduits and on equipment utilized in the transportation, delivery and processing of fluid columns. It may also be utilized to accelerate the separation of oil and water and increase the efficiency of oil/water separation equipment.

33 Claims, 5 Drawing Sheets

METHOD AND APPARATUS FOR PREVENTING SCALE DEPOSITS AND REMOVING CONTAMINANTS FROM FLUID COLUMNS

BACKGROUND OF THE INVENTION

The present invention relates to the prevention and removal of deposits such as scale, corrosion, paraffin and asphaltene that form within conduits and on the surfaces of equipment utilize in the transmission of fluid columns. The instant invention also provides for the separation of contaminants and other components that comprise a fluid column receptive to magnetic treatment.

It is common for contaminant deposits to accumulate within conduits and on equipment utilized in the transportation and transmission of fluids. For example, in oilfield pipelines a mixture of oil, water and minerals typically flow out of a well into apparatus utilized to separate marketable oil from water and other components of the fluid column. Paraffin, asphaltene and mineral scale deposits forming within conduits used to transport this fluid mixture restrict the flow of fluid within the pipeline. Further, such deposits and the congestion they create typically lead to the deterioration of pumps, valves, meters and other equipment utilized to propel and monitor the flow of fluid through a pipeline system. These types of deposits typically result in lost production and substantial expenditures for thermal, mechanical or chemical remediation to restore full flow capacity to a pipeline.

Many thermal exchange systems, such as cooling towers or boilers, utilize water as a heat transfer medium. Scale and corrosion deposits can restrict the flow of water and impede the efficient operation of pumps, valves and other equipment. Further, deposits on thermal exchange grids act as layers of insulation and inhibit the transfer of heat carried by the water. Periodic descaling of heat exchange equipment typically results in process downtime and substantial labor and remediation expenditures. Therefore, contaminant deposits result in restricted flow, lost efficiency and increased energy consumption in thermal exchange systems.

In closed-loop systems where water is continuously circulated to facilitate heat transfer from one area of a system to another, one common method of removing corrosion and scale deposits, along with controlling algae and bacterial growth, utilizes chemical treatment of the water. Over time, the build-up of chemicals, minerals and other contaminants within the water typically results in it being unfit for continued use. Further, chemical laden water typically requires additional treatment to make it suitable for discharge into the environment and usually incurs a substantial surcharge for its permitted release into a municipal wastewater disposal system. Chemical treatment of fluid columns is costly, requires the storage, handling and dispensing of dangerous chemicals and increasingly gives rise to growing environmental concerns directed to the quality of the water being discharged.

One alternative to chemical treatment is the utilization of magnetic field generators to introduce magnetic flux to a contaminated fluid column. Magnetic field generators are commonly divided into two distinct groups, permanent magnets and electromagnets. Each group utilizes magnetic energy to treat a fluid column. The density of the magnetic flux available in the fluid treatment area, which is typically the interior of a conduit through which a fluid flows, can be measured and is typically expressed in Gauss Oersted units. Commonly referred to as "gauss", this unit of measurement is useful in the comparison of magnetic fluid treatment devices. While the use of magnets has proven to provide positive benefits in the treatment of certain fluid columns, prior art magnetic field generators are challenged by a number of deficiencies.

Permanent magnets typically generate magnetic flux via a fixed array of rare earth magnets proximate the flow path of a fluid through a segment of conduit. Even though many types of permanent magnets have the capacity to generate large amounts of magnetic energy near their surface, the strength of their magnetic fields is fixed and cannot be adjusted. Further, when using a gauss meter to measure the magnetic energy of a permanent magnet, the strength of the magnetic energy tends to rapidly diminish as the probe of the gauss meter moves away from its surface. Therefore, effective magnetic treatment can best be realized by passing a fluid as close to the surface of a permanent magnet as possible.

The flow rate of a fluid as it passes through the fixed strength of a permanent magnet is a primary factor in determining the effectiveness of the treatment provided by such a device. Effective treatment of a contaminated fluid column may occur when the flow rate of a fluid is matched to a specific sized array of fixed magnets. If the velocity of a feedstock through a permanent magnet varies from the required flow rate, or the fluid passes too far from the surface of a permanent magnet, desired treatment of a fluid column may not occur. Thus, when the velocity of a fluid is not matched to a fixed ratio of conduit size to the length of a fixed magnetic field strength required to provide the conduction coefficients necessary for effective treatment, use of permanent magnets may result in lost efficiency or a total lack of magnetic fluid treatment.

Electromagnets may be formed by electrically charging a coil of an electrical conducting material, such as a length of metal wire. Coiling an electrically charged wire allows the magnetic field that radiates from the circumference of the wire to concentrate within the center of the coil of wire. Wrapping a strand of electrical conductor, such as a length of copper wire, around a conduit, such as segment of pipe, and connecting the ends of the electrical conductor to power supply is a common method of making an electromagnet. A basic principal of electromagnetic field generation states the strength of the magnetic field is determined by multiplying the number of turns of a coil of wire by the electrical current, or amperage, flowing through to the coil. This calculation of amperage and wire turns is commonly referred to as amp-turns, with the gauss provided by a simple electromagnet typically being proportional to its amp-turns. The magnetic field generated by an energized coil of wire may be strengthened by increasing the number of turns of wire, increasing the voltage supplied to the coil or increasing both the number of turns and the intensity of the electrical supply. The strength of the magnetic field generated by such a device may be increased or decreased by adjusting the voltage supplied to the coil of wire.

In addition to creating an electromagnetic field, this configuration of coiled electrically charged wire typically generates heat. Heat generation has been a major limitation in the development of the maximum electromagnetic field strength of prior art electromagnet devices. For example, heat generated by an electrically charged coil of wire increases the resistance within the coil of wire. This increased resistance results in a drop in the flow of current through the device and reduces the amp-turns, or gauss, of the electromagnet. Excessive heat generation typically leads to the failure of prior art electromagnet devices when heat retention within the coiled wire is sufficient to cause segments of the wire coil to melt and contact each other. The resulting short circuit reduces the efficiency of the device due to fewer amp-turns being in effect. Heat also causes the coil of wire to part and cause an open circuit so no magnetic field can be generated. The generation and retention of heat impedes the flow of current through the wire coil of prior art electromagnet devices and makes them less effective, or totally useless, in fluid treatment until the continuity in the entire electrical circuit is restored.

In some instances, a protective housing may be utilized to protect the coiled wire from cuts, abrasions or other damage. However, encasing a wire coil within a protective housing typically promotes the retention of heat generated by the energized coil. To disperse the heat from the coil, the protective housings of prior art devices are typically filled with mineral oil, graphite or other materials. Oil and other heat dispersing materials add significant weight to these prior art devices, making them difficult to handle and install. Further, the potential of oil or other heat dispersing materials leaking from the protective housings and causing damage to the environment, along with other maintenance issues, pose additional problems for end users.

Heat dissipation is critical to the overall efficiency and effectiveness of an electromagnetic filed generator. Heat generated by a wire coil contiguous with the outer surface of a conduit may radiate through the conduit and into a fluid flowing through it. Heat generated by the outer layer of a cluster of wire coiled around a conduit may dissipate into the atmosphere if the device is used in an open-air configuration or transferred through heat dispersing materials to the body of an enclosure and then into the atmosphere if it is encased within a protective housing. However, the inability of prior art devices to transfer and dissipate heat generated by their wire coils typically results in open circuits or short circuits. Thus, prior art devices are typically limited in the number of layers of coiled wire that may be utilized to produce an electromagnetic field generator due to the generation and retention of heat within a cluster of wire.

SUMMARY OF THE INVENTION

The instant invention provides a method and apparatus for use in the prevention of scale, corrosion, paraffin, asphaltene and other deposits within conduits utilized in the transmission of fluid columns by providing a feedstock receptive to magnetic treatment with a plurality of concentrated magnetic fields at distinct points. By subjecting a feedstock to a plurality of intense magnetic fields, substances such as silica, calcium carbonate, paraffin or asphaltenes tend to remain in suspension rather than adhere to the internal walls of conduits and equipment utilized to transport the fluid. The instant invention has also proven to be useful in accelerating the separation of oil and water, thereby increasing the efficiency of oil/water separation equipment.

Absent magnetic treatment, many substances are typically absorbed into ions that collect as adhesive-like substances within a fluid column and form deposits along the surface of the internal boundary walls of conduits utilized to transport fluids. Magnetic fluid treatment typically does not remove contaminants from a fluid column. Rather, it induces a similar charge to elements carried within a fluid column that significantly decreases their incidence of surface contact. This induced polarization results in similarly charged ions within a feedstock continuously repelling each other and typically eliminates the adhesive properties that would otherwise result in the formation of scale or similar deposits. Thus, substances such as paraffin, asphaltene, silica or calcium tend to become non-adhesive and typically remain suspended within a fluid column.

In many instances, the induced polarization of substances suspended within a fluid column and flowing through a piping system may result in the re-polarization of elements that have previously settled and formed scale deposits. Re-polarization of existing scale and other deposits allows such substances to be suspended within a magnetically treated fluid column, thereby restoring flow through the piping system and improving the efficiency of its transmission equipment. Where chemical treatment has previously been used for scale prevention, electromagnet treatment may result in a substantial reduction, or the total elimination, of chemical additives to the system.

Magnetic treatment may also be used to accelerate the separation of oil and water. Environmental regulations require entities generating contaminated fluid columns as part of a manufacturing process or the result of an incidental spill or leak with the containment, treatment and elimination of pollutants from a fluid column prior to discharging a treated effluent into the environment. The instant invention has proven to boost the efficiency of oil/water separation equipment by influencing forces creating oil/water mixtures and breaking many oil/water emulsions. This allows suspended or emulsified hydrocarbons, such as oil, to precipitate and then be extracted from a hydrocarbon-contaminated feed stream as it passes through an oil/water separation device. Other contaminants, such as suspended solids, may remain within a fluid column and may then be extracted from a feedstock by simple filtration apparatus. If a fluid column requires additional remedial action prior to its release into the environment, the feed stream may be further treated to provide an effluent suitable for discharge.

Many prior art devices utilize a conduit comprising a non-magnetically conductive material, such as a length of plastic pipe, surrounded by a coil of wire to generate a magnetic field or use a magnetically conductive material, such as carbon steel, to form a protective housing for the coil of wire. Such devices are capable of providing magnetic treatment in only one area, within the energized coil of wire. In contrast, the instant invention provides magnetic fluid treatment at a plurality of distinct points. When properly configured and arranged within a piping system utilizing apposite piping system components, the instant invention has the capacity to provide magnetic treatment to a fluid column not only within the coiled electrical conductor encircling the conduit, but at each end of the magnetically energized conduit as well.

The instant invention utilizes a length of magnetically conductive conduit, a plurality of non-magnetic coupling devices and an energized coil of an electrical conductor to provide magnetic fluid treatment at a plurality of distinct points. As used herein, an electromagnetic field generator having a capacity to provide magnetic treatment of a fluid column at a plurality of distinct points is defined as a length of conduit comprising a magnetically conductive material with a first and a second coupling device comprising a non-magnetically conductive material connected to each end of the conduit and an electrical conductor coiled around a segment of said conduit to form a continuous wire coil, said electrical conductor being connected to an electrical power supply having a capacity to energize the coiled electrical conductor and produce an electromagnetic field.

The magnetically conductive conduit is a magnetically conductive material defining a fluid impervious boundary wall with an inner surface and an outer surface and having a fluid entry port at one end and a fluid discharge port at the other end. Each non-magnetic coupling device establishes a non-magnetically conductive conduit segment comprising a non-magnetic material defining a fluid impervious boundary wall with an inner surface and an outer surface and having inlet and outlet ports, the inner surface of said inlet and outlet ports adapted to receive a segment of conduit. The first non-magnetically conductive inlet conduit segment, in fluid communication with the inlet port of the magnetically conductive conduit, and the second non-magnetically conductive inlet conduit segment, in fluid communication with the outlet port of the magnetically conductive conduit, make fluid impervious, non-contiguous connections between the magnetically conductive conduit and other segments of conduit to promote the flow of fluid through the energized conduit.

Encircling a segment of the magnetically conductive conduit with an electrical conductor forms the continuous wire coil, said electrical conductor comprising a continuous strand of an electrical conducting material having a first conductor lead and a second conductor lead. Each turn of the continuous strand of electrical conductor may be contiguous with the adjacent turn of electrical conductor to form an uninterrupted layer of the coiled electrical conductor. While an uninterrupted layer of coiled wire is preferred, mechanical winding of an electrical conducting material may result in small gaps or openings between adjacent turns of the continuous wire coil. Such gaps serve no beneficial purpose and may in fact result in hot spots within the continuous coil of wire and impede its performance. An uninterrupted layer of a continuously coiled electrical conducting material, with each turn of the electrical conducting material being contiguous with its adjacent turn, provide the most efficient means of generating the electromagnetic field of the instant invention. Additional layers of the continuous wire coil may be added to achieve the desired configuration of a device.

To generate an electromagnetic field, a first conductor lead of the continuous coil of wire may be connected to a first terminal of an electrical power supply and a second conductor lead of the continuous wire coil may be connected to a second terminal of the power supply, the electrical power supply having the capacity to energize the coiled electrical conductor and produce an electromagnetic field within the inner surface of the fluid impervious boundary wall of the conduit. When voltage is supplied to the continuous coil of wire, the amp-tuns of the energized coil provide a magnetic field that is absorbed by the magnetically conductive conduit. The magnetic flux loop generated by the energized wire encircling the conduit flows from one end of the wire coil, around the periphery of the wire coil along the longitudinal axis of the conduit and to the other end of the continuous wire coil. In the instant invention, the strength of the magnetic field is of sufficient magnitude to induce magnetic treatment to a fluid passing through the magnetically energized conduit and provide a magnetic flux loop extending beyond each end of the conduit. The flow of the magnetic flux loop typically extends from a point where the flux loop consolidates beyond one end of the magnetically energized conduit, around the periphery of the continuous coil of wire along the longitudinal axis of the conduit and to a point where the flux loop reconsolidates beyond the other end of the magnetically energized conduit.

The magnetic field and the magnetic flux loop are concentrated at three distinct points; the inlet port at one end of the magnetically energized conduit, the center of the wire coil and the outlet port at the other end of the conduit. These distinct points of concentrated magnetic energy are typically of sufficient strength to provide effective magnetic treatment of a fluid passing through the magnetically energized conduit. In contrast, the magnetic flux loop generated by prior art devices utilizing non-magnetically conductive conduits, such as plastic pipe, cannot be absorbed by the conduit. Absent the absorption of the magnetic field by the conduit, magnetic fluid treatment cannot be provided to a fluid passing through the inlet and outlet ports of a non-magnetically conductive conduit and is therefore limited to the area within the coil of wire.

Prior art devices utilizing a magnetically conductive conduit encircled by an energized coil of wire typically utilize coupling devices and segments of conduit comprising a similar magnetically conductive material to promote the flow of fluid through their devices. In a continuous configuration of magnetically conductive components, the magnetic field generated by an energized coil of electrical conductor is absorbed by the contiguous arrangement of magnetically conductive conduits and magnetically conductive coupling devices in fluid communication with one another. Thus, the magnetic energy that may otherwise concentrate at each end of a magnetically energized conduit is absorbed by the contiguous magnetically conductive components and is no longer of sufficient strength to provide magnetic fluid treatment at a plurality of distinct points. Therefore, a piping system utilizing magnetically conductive components connected in fluid communication with one another limits magnetic fluid treatment to the single area within the energized coil of electrical conductor.

Other prior art devices utilize a plurality of distinct clusters of coiled wire to encircle a single length of magnetically conductive conduit. As the magnetically conductive conduit absorbs the magnetic field generated by each distinct cluster of coiled wire, the magnetic energy tends to concentrate in a single area near the center of the clustered coils. Thus, a plurality of distinct coils of wire encircling on a length of magnetically conductive conduit fails to provide magnetic treatment at a plurality of distinct points as the conduit absorbs the magnetic fields and concentrates them in a single area.

In the instant invention, the strength of the magnetic field is sufficient to provide a magnetic flux loop extending beyond each end of the magnetically energized conduit. The flow of the magnetic flux loop typically extends from a point where the flux loop consolidates beyond one end of the magnetically energized conduit, around the periphery of the continuous coil of wire along the longitudinal axis of the conduit and to a point where the flux loop reconsolidates beyond the other end of the magnetically energized conduit. When included in a piping system, magnetic fluid treatment is provided at a plurality of distinct points by utilizing non-magnetic coupling devices to make fluid impervious, non-contiguous connections of the inlet and outlet ports of a magnetically energized conduit with additional segments of conduit utilized to promote the flow of fluid through the magnetically energized conduit.

The non-magnetic coupling devices establish the flow of a fluid along a path extending through a first non-magnetically conductive inlet conduit segment, a magnetically energized conduit downstream of the inlet segment and a second non-magnetically conductive outlet conduit segment downstream of the magnetically conductive conduit segment. Non-magnetic material allows the magnetic flux loop of the magnetically energized conduit to pass through the fluid impervious boundary wall of the coupling devices and concentrate near the ends of the magnetically energized conduit so that fluid flowing through the non-magnetically conductive conduit segments may receive magnetic treatment in these regions.

For example, a feed stream comprising a fluid column receptive to magnetic treatment may be introduced to the inlet port of a first non-magnetic coupling device connected to a magnetically energized conduit to establish the flow of fluid through the apparatus. As the feed stream flows through the first non-magnetically conductive conduit segment, in fluid communication with the inlet port of the magnetically energized conduit, it may be exposed to approximately 150 gauss of magnetic flux concentrated in this first region of magnetic treatment. After being discharged from the inlet port of the conduit, the fluid column may then be exposed to 200 gauss of magnetic energy concentrated in a second region of magnetic treatment as it is directed to pass through the energized coil along a path extending through and substantially orthogonal to each turn of the electrical conductor forming the coil of wire surrounding the outer surface of the conduit. As the feed stream is directed to flow through a second non-magnetically conductive conduit segment, in fluid communication with the outlet port of the magnetically energized conduit, it is then exposed to approximately 150 gauss of magnetic flux concentrated in this third region of magnetic treatment. The fluid column may then be discharged from the second non-magnetic coupling device as a processed feed stream.

Thus, fluid passing through an electromagnetic field generator utilizing non-magnetic coupling devices serving as non-magnetically conductive inlet and outlet conduit segments making fluid impervious, non-contiguous connections between the inlet and outlet ports of a magnetically energized conduit and additional segments of conduit to promote the flow of fluid through the magnetically energized conduit may receive magnetic treatment at a plurality of distinct points.

Because the magnetically conductive conduit absorbs the magnetic field generated by the energized coil of wire encircling it, other magnetically conductive objects will typically be attracted to it. Further, as the gap between a magnetically energized conduit and another magnetically conductive object decreases, the strength of the magnetic field in the space between the energized conduit and the other object typically increases due to the magnetic energy being concentrated in a smaller area.

Utilizing a non-magnetic coupling device to make a non-contiguous connection between a magnetically energized conduit and an additional segment of magnetically conductive conduit allows the strength of the magnetic field concentrated at the end of the energized conduit to increase due to the attraction of the non-energized conduit to the energized conduit. Further, as the distance between the ends of the conduits decreases, the strength of the magnetic field in the space between the ends of the two conduits typically increases as the magnetic energy is concentrated in a smaller area.

For example, a feed stream passing through a first non-magnetic coupling device making a fluid impervious, non-contiguous connection between a first length of non-energized magnetically conductive conduit and a magnetically energized conduit may be exposed to approximately 300 gauss of magnetic energy concentrated in this first region of magnetic treatment. The fluid column may then be exposed to 200 gauss of magnetic flux in a second region of magnetic treatment as it is directed to pass through the energized coil along a path extending through and substantially orthogonal to each turn of the electrical conductor forming the coil of wire surrounding the outer surface of the magnetically energized conduit. The feedstock may then be exposed to approximately 300 gauss of magnetic flux in a third region of magnetic treatment as it passes through the magnetic field concentrated in the fluid impervious, non-contiguous connection between the magnetically energized conduit and a second length of non-energized magnetically conductive conduit provided by a second non-magnetic coupling device.

Thus, the non-contiguous connections of a magnetically energized conduit with two flanking lengths of non-energized magnetically conductive conduit may result in the magnetic flux concentrated at each end of the magnetically energized conduit increasing from 150 gauss to 300 gauss. However, if the end of a magnetically energized conduit is allowed to come in contact with a flanking length of magnetically conductive conduit, the magnetic flux loop to be absorbed by the contiguous configuration of magnetically conductive conduits and magnetic energy will no longer be concentrated at the end of the magnetically energized conduit. Thus, 200 gauss of magnetic fluid treatment may be attained as a feed stream passes through the magnetic energy concentrated within the energized coil of wire, but no magnetic fluid treatment will be provided at the end of the energized conduit in fluid communication with a flanking length segment of non-energized magnetically conductive conduit.

Some prior art devices insert baffling devices or core means within the bore of the conduit used to transport a fluid through a magnetic field in an attempt to convolute the flow of a fluid or otherwise effect the treatment provided by the device. However, the insertion of baffles, core means or other apparatus within the internal boundary wall of the magnetically conductive conduit of the instant invention typically restricts the flow of fluid through the conduit and provides no benefit to the magnetic fluid treatment provided by the device. The backflow and eddies that normally occur as a fluid column passes through a conduit result in sufficient turbulence for effective magnetic fluid treatment. Therefore, the instant invention does not include any type of baffle within the magnetically conductive conduit or core means disposed within and spaced apart from the internal boundary wall of the magnetically energized conduit. This allows the fill flow capacity of the device to be realized.

While the amp-turns of an electromagnetic field generator typically indicate the gauss strength of a device, a method of attaining a significant increase in gauss strength generated by an identical number of amp-turns has been discovered. This is done by dividing the length of magnetically conductive conduit of the previously disclosed device into two shorter, equal lengths of conduit and similarly dividing the length of electrical conductor of the previously disclosed device into two smaller, equal lengths. The first smaller length of electrical conductor may be wound around the first shorter length of conduit to form a first coil of wire encircling the first conduit and the second smaller length of electrical conductor may be wound around the second shorter length of conduit to form a second coil of wire encircling the second conduit. A non-magnetic coupling device may be used to make a fluid impervious, non-contiguous connection between these two shorter lengths of conduit encircled by wire coils.

The second conductor lead of the first coil of wire encircling the first conduit is connected to the adjacent first conductor lead of the second coil of wire encircling the second conduit. The now continuous coil of wire surrounding the non-contiguously connected conduits may be energized with a single power supply. The combined amp-turns of the two shorter magnetically energized conduits are identical to the number of amp-turns of the original larger unit. However, the strength of the magnetic field within either of the two smaller coils is typically less than half the strength of the magnetic field within the larger coil. This is due to the amp-turns of the larger device being concentrated in only one area while the amp-turns of the two smaller units are concentrated in two separate and distinct areas.

The distinct magnetic fields generated by each of the two smaller units are concentrated in the space between the magnetically energized conduits. The magnetic energy concentrated in the space between the non-contiguously connected, magnetically energized conduits is typically more than six times that found within the coiled electrical conductor of the larger unit. This enhanced point of magnetic fluid treatment is the result of the attraction of the non-contiguous, magnetically energized conduits to one another and the concentration of their distinct magnetic fields one distinct area.

The previously disclosed use of a non-magnetic coupling device to connect a magnetically energized conduit and a non-energized magnetically conductive conduit has been shown to boost the strength of magnetic energy concentrated at the end of the energized conduit to 150% of the strength of the magnetic field concentrated within its coil of wire. However, the non-contiguous connection of the two shorter magnetically energized conduits provides an even greater increase of magnetic energy. The fluid impervious, non-contiguous connection of two magnetically energized conduits via a non-magnetic coupling device may result in the magnetic energy concentrated in the space between the conduits being more than 1500% of the strength of the magnetic field within either of the two smaller energized coils. Further, non-magnetic coupling devices may be utilized to provide fluid impervious, non-contiguous connections at the inlet port of the first magnetically energized conduit and outlet port of the second magnetically energized conduit to provide additional distinct points of magnetic fluid treatment.

For example, a fluid flowing through two magnetically energized conduits connected via a non-magnetic coupling device may be exposed to approximately 120 gauss of magnetic energy as it passes through the inlet port of the first conduit. The fluid column may then be exposed to 80 gauss of magnetic flux as it is directed to pass through the first energized coil along a path extending through and substantially orthogonal to each turn of the first electrical conductor forming the first coil of wire surrounding the outer surface of the first conduit. As the fluid passes through the non-magnetic coupling device connecting the outlet port of the first magnetically energized conduit and the inlet port of the second magnetically energized conduit, it may be exposed to more than 1200 gauss of magnetic energy concentrated in the space between the two magnetically energized conduits. As the fluid flows through the second magnetically energized conduit, it may then be exposed to 80 gauss of magnetic flux as it is directed to pass through the second energized coil along a path extending through and substantially orthogonal to each turn of the second electrical conductor forming the second coil of wire surrounding the outer surface of the second conduit. The fluid column may finally be exposed to approximately 120 gauss of magnetic energy as passes through the outlet port of the second conduit However, if the ends of two magnetically energized conduits are allowed to come in contact with each other, their magnetic energy will concentrate in a single area, similar to a single area of concentrated magnetic energy provided by several distinct clusters of coiled electrical conductor encircling a length of magnetically conductive conduit. The direct contact of energized conduits results the magnetic energy generated by the distinct coils of energized wire being absorbed by the now contiguous magnetically conductive conduits and concentrated in a single area. Therefore, the adjacent ends of two magnetically energized conduits must be in a non-contiguous connection to allow their distinct magnetic fields to concentrate in the space between them. Absent the claimed fluid impervious, non-contiguous connection between the magnetically energized conduits, a distinct point of enhanced magnetic fluid treatment in the space between the conduits is not present.

A number of variables may be modified to optimize tie instant invention. For example, the size and shape of the wire used to form the wire coil, the length of the winding along the surface of the conduit and the number of layers of wire forming the coil of wire may be adapted to specific applications to optimize he device. These factors, along with the output capacity of the power supply determine the total amp-turns of the device. Other variables include the size, shape and types of materials comprising the conduit and coupling devices, and the size, shape and composition of materials comprising a protective housing, if included.

The instant invention may be modified to provide magnetic treatment to fluids containing corrosive, caustic or other types of components that could damage the fluid impervious boundary wall of the magnetically conductive conduit or otherwise affect the structural integrity of the device. Tubular conduits comprising materials such as polyethylene, polypropylene, polyurethane, nylon or plasticized polyvinyl chloride typically have a resistance to many fluids that may damage the magnetically conductive conduit. Such fluids may receive exposure to magnetic energy at a plurality of distinct points by adapting the instant invention to sleeve a segment of non-magnetically conductive pipe, hose or other form of tubular conduit within the aperture of the magnetically energized conduit.

The instant invention may be installed on a segment of conduit within a piping system comprising a non-magnetically conductive material utilized in the transmission of a fluid column. The diameter of the inner surface of the fluid impervious boundary wall of the magnetically conductive conduit must greater thin the external diameter of the fluid impervious boundary wall of the non-magnetically conductive conduit so the magnetically energized conduit may sleeve a segment of the non-magnetic conduit.

When the flow of fluid through a non-magnetically conductive piping system must not be interrupted, the magnetically conductive conduit may be split along its longitudinal axis into sections of preferably equal size. These sections may then be rejoined adjacent the outer surface of the fluid impervious boundary wall of the non-magnetic conduit so that the magnetically conductive conduit encircles a segment of the non-magnetic piping system. Non-magnetically conductive conduit segments may be connected to the ends of the magnetically conductive conduit so that they encircle a segment of the non-magnetic piping system. The electrical conductor may then be coiled around the outer surface of the magnetically conductive conduit and energized by a power supply. The resulting sleeve comprising a magnetically energized conduit encircling the non-magnetic conduit provides for magnetic fluid treatment at a plurality of distinct points.

Because the internal conduit transporting the fluid through the piping system is non-magnetic, the magnetic flux generated by the magnetically energized conduit is not captured or absorbed by it. The magnetic energy of the flux loop is therefore free to flow through the non-magnetically conductive conduit as if through air and may concentrate within the fluid transmission conduit at distinct points relative to the coiled electrical conductor and each end of the magnetically energized conduit.

Installation of the instant invention in a large diameter piping system may require the use of flanged connections at the inlet and outlet ports of the magnetically energized conduit. In such applications, a gasket comprising a non-magnetically conducting material may be utilized to seal a flanged connection between the end of a magnetically energized conduit and the end of another segment of conduit. When utilized in this manner, a gasket comprising a non-magnetically conducting material provides a coupling device establishing a non-magnetically conductive conduit segment defining a fluid impervious boundary wall with an inner surface and an outer surface and having inlet and outlet ports, the inner surface of said inlet and outlet ports adapted to receive a segment of conduit. The use of a non-magnetic gasket allows the magnetic flux loop to pass through its fluid impervious boundary wall and concentrate near the end of the magnetically energized conduit so that fluid within this non-magnetically conductive conduit segment may receive magnetic treatment.

Cuts, abrasions, dents, exposure to sunlight and other types of damage may affect the structural integrity of the coiled electrical conductor and impair its performance. An enclosure may be used to protect the wire coil. It may be solid-bodied or may include a pattern of perforations that allow for ventilation of the unit.

Prior art devices typically utilize a protective housing formed with materials having a high magnetic permeability to protect the coil of wire. The enclosures are typically formed by attaching a pair of end plates to the conduit on either side of the coil of wire. The end plates typically comprise a magnetically conductive material similar to that comprising the conduit, with one end plate located between the inlet port of the conduit and the coil of wire and the other end plate located between the coil of wire and the outlet port of the conduit. The coil of wire is then enclosed within a protective housing by attaching a tubular member, comprising a similar magnetically conductive material, to the pair of magnetically conductive end plates affixed to conduit.

The use of a magnetically conductive material, such as carbon steel, to form a protective housing provides a flow path for the magnetic flux loop generated by the coil of wire and prevents stray magnetic fields outside of the housing. This typically results in the magnetic flux loop generated by an energized coil of wire being captured within the magnetically conductive housing so that little, if any, gauss strength can be measured at either end of a magnetically energized conduit. Thus, magnetic fluid treatment is limited to the area within the energized coil of wire. For example, a fluid flowing through a magnetically energized conduit enclosed within a housing comprising a magnetically permeable material may only be exposed to 200 gauss of magnetic treatment as it passes through the coil of wire.

Therefore, in order to achieve magnetic fluid treatment at a plurality of distinct points it is advantageous to utilize a non-corrosive material having a high coefficient of thermal conductivity and low magnetic permeability, such as aluminum or stainless steel, to form the protective enclosure for the coil of wire. Non-magnetic coupling devices may be used to connect a magnetically energized conduit enclosed with a non-magnetic housing to a piping system to promote the flow of fluid through the energized conduit. The non-magnetic components prevent the magnetic flux loop from being captured, absorbed or contained within the housing or the couplings so that it is therefore free to flow as if through air.

For example, fluid may flow through a magnetically energized conduit, enclosed within a non-magnetic protective housing, utilizing non-magnetic coupling devices to provide fluid impervious, non-contiguous connections at each end of the conduit to promote the flow of a feed stream through the energized conduit. The fluid may be exposed to 150 gauss of magnetic flux as passes through the inlet port of the energized conduit and then 200 gauss of magnetic energy as it passes through the coil of wire encircling it. Additionally, the fluid may be exposed to 150 gauss of magnetic flux as it passes through the outlet port of the energized conduit. Thus, magnetic fluid treatment may be provided at a plurality of distinct points by a magnetically energized conduit enclosed within a non-magnetic housing. In comparison, magnetic fluid treatment is only provided within the coil of wire of a similar energized conduit enclosed within a magnetically permeable housing.

In certain applications, it may be desirable to contain the magnetic flux loop of the energized coil of wire to prevent it from flowing through the air surrounding the device. Magnetic fluid treatment may be provided at a plurality of distinct points by utilizing a protective housing comprising a magnetically conductive material that extends beyond each end of a magnetically energized conduit. In this configuration, non-magnetic coupling devices are utilized within a magnetically conductive enclosure to make fluid impervious, non-contiguous connections between the energized conduit and a pair of flanking lengths of non-energized magnetically conductive conduit.

A first end plate may be affixed to a first flanking length of non-energized magnetically conductive conduit making a fluid impervious, non-contiguous connection at the inlet port of the magnetically energized conduit and a second end plate may be affixed to a second flanking length of non-energized magnetically conductive conduit making a fluid imperious, non-contiguous connection at the outlet port of the magnetically energized conduit. The coil of wire may then be enclosed within a protective housing by attaching a tubular member to the end plates affixed to the flanking lengths of conduit. The end plates and the tubular member forming the protective housing typically comprise a magnetically conductive material similar to that comprising the flanking lengths of magnetically conductive conduit. The use of a magnetically conductive protective housing provides a path for flow of the magnetic flux loop generated by the energized electrical conductor and captures it within the housing. Non-magnetic coupling devices are used within the magnetically conductive housing to connect the magnetically energized conduit with the flanking lengths of conduit to promote the flow of fluid through the energized conduit. The non-contiguous connections provided by the non-magnetic couplings prevent the magnetic flux loop from being absorbed by a contiguous arrangement of magnetically conductive conduits and allow the magnetic energy generated by the energized coil of wire to concentrate in the spaces between the energized conduit and the flanking segments of magnetically conductive conduit.

For example, fluid may flow through a magnetically energized conduit utilizing non-magnetic coupling devices to provide fluid impervious, non-contiguous connections with flanking lengths of magnetically conductive conduit to promote the flow of a feed stream through the energized conduit. The magnetically energized conduit and the non-magnetically conductive conduit segments may be enclosed within a magnetically conductive housing having its end plates affixed to the flanking lengths of conduit. The fluid may be exposed to 150 gauss of magnetic flux as it passes through the inlet port of the magnetically energized conduit, then 200 gauss of magnetic energy as it passes through the coil of wire encircling the conduit and 150 gauss of magnetic flux as it passes through the outlet port of the energized conduit. Thus, magnetic fluid treatment may be provided within a magnetically conductive housing at a plurality of distinct points by utilizing non-magnetic coupling devices to make fluid impervious, non-contiguous connections at the inlet and outlet ports of the magnetically energized conduit.

The instant invention provides an environmentally friendly device capable of inducing a similar ionic charge to dissolved and suspended substances within a fluid column. This typically allows contaminants within a fluid column to become non-adhesive and inhibits their accumulation as deposits within conduits and on surfaces of equipment utilized in the transmission of the fluid. It has also proven to be effective in breaking many oil/water emulsions and thereby improves the efficiency of oil/water separation equipment. In certain applications, magnetic fluid treatment may be effective in eliminating biological contaminants, such as bacteria.

When compared to prior art devices, the instant invention provides superior magnetic fluid treatment by utilizing non-magnetic coupling devices to allow the strength of the magnetic field generated by the energized coil of electrical conductor encircling the magnetically conductive conduit to concentrate at a plurality of distinct points rather than in a single area. Further, the instant invention typically weighs less, generates less heat, requires less electrical energy and generates greater gauss strength than similarly sized prior art devices.

BRIEF DESCRIPTION OF THE DRAWINGS

The accompanying drawings illustrate the preferred embodiments of the invention in which.

DESCRIPTION OF THE PREFERRED EMBODIMENT

The instant invention provides magnetic fluid treatment at a plurality of distinct points by passing a fluid receptive to magnetic treatment through a conduit having a first non-magnetically conductive inlet conduit segment, a magnetically conductive conduit segment downstream of the inlet segment and a second non-magnetically conductive outlet conduit segment downstream of the magnetically conductive conduit segment. An electrical conductor is coiled around the magnetically conductive conduit segment with the coils oriented substantially orthogonal to the fluid flow. An electrical power supply is coupled to the coiled electrical conductor and energizes the coil to provide an electromagnet that produces a magnetic field. The coiled conductor forms an electromagnet establishing a magnetic field having lines of flux directed along the flow path of the fluid and concentrated within the inlet conduit segment, within the magnetically conductive conduit segment and within the outlet conduit segment. If desired, a protective housing may be included.

Figure 1:
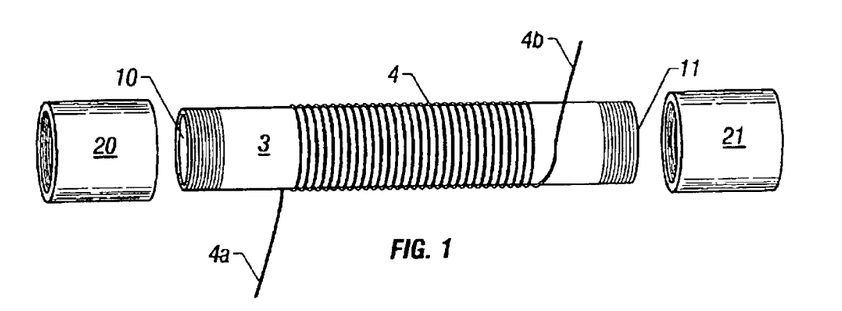
FIG. 1 is an exploded view of the instant invention.

When properly integrated into a piping system, the electromagnetic field generator of the instant invention has the capacity to provide magnetic treatment to a fluid column within the coil of wire surrounding the conduit and at each end of the conduit. FIG. 1 is an exploded view of the instant invention. Magnetically conductive conduit 3 comprising a fluid impervious boundary wall with an inner surface and an outer surface and having a fluid entry port 10 at one end and fluid discharge port 11 at the other end is shown between first non-magnetic coupling device 20 and a second non-magnetic coupling device 21. Each non-magnetic coupling device establishes a non-magnetically conductive conduit segment comprising a fluid impervious boundary wall with an inner surface and an outer surface and having inlet and outlet ports. The inner surfaces of said inlet and outlet ports are adapted to receive a segment of conduit. Electrical conductor 4 is shown coiled around a segment of conduit 3 as an uninterrupted wire coil encircling the conduit, said electrical conductor comprising a continuous strand of an electrical conducting material having a first conductor lead 4a and a second conductor lead 4b. Each turn of the wire may be contiguous with the adjacent turn of wire to form the uninterrupted layer of coiled wire that provides the most efficient means of generating the electromagnetic field of the instant invention. If desired, additional layers of wire may be added to achieve the desired configuration of the coil of wire.

To generate an electromagnetic field, first conductor lead 4a of the continuous coil of wire may be connected to a first terminal of a power supply and second conductor lead 4b of the continuous wire coil may be connected to a second terminal of the power supply. When voltage is supplied to the continuous coil of wire, the magnetic field generated by the energized coil of electrical conductor 4 is absorbed by magnetically conductive conduit 3. The magnetic flux loop generated by the coiled wire surrounding the conduit flows from one end of the continuous wire coil, around the periphery of the continuous wire coil along the longitudinal axis of the conduit and returns to the other end of the continuous wire coil. To provide effective magnetic fluid treatment at a plurality of distinct points with a single electromagnetic field generator, the magnetic field must be of sufficient strength to extend beyond the ends of the length of the conduit.

Figure 2:
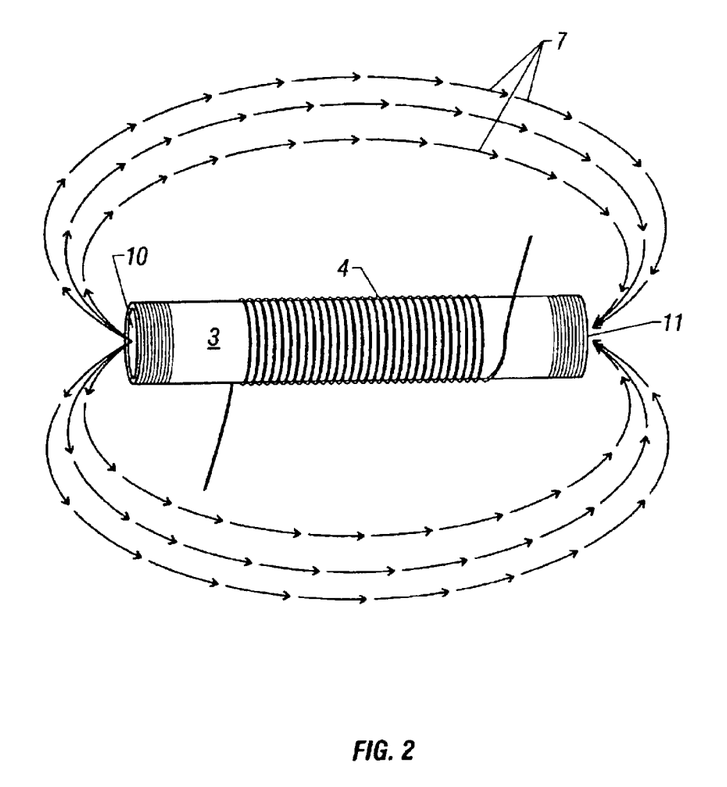
FIG. 2 shows the flow of a magnetic flux loop encircling a length of magnetically energized conduit.

FIG. 2 shows the flow of magnetic flux loop 7 generated by energized coil of electrical conductor 4 encircling magnetically energized conduit 3. Magnetic flux loop 7 is shown consolidated at a point beyond inlet port 10 of magnetically energized conduit 3, flowing around the periphery of continuous coil of wire 4 along the longitudinal axis of the conduit and reconsolidating at a point beyond outlet port 11 at the other end of the conduit. The magnetic field absorbed by magnetically conductive conduit 3 and the magnetic flux loop generated by the energized coil of wire tend to concentrate in tree distinct regions of the conduit; near the center of the coil of wire 4 and inlet port 10 and at outlet port 11 at the ends of the conduit. A fluid passing through these three regions may receive magnetic treatment at a plurality of distinct points.

Figure 3:
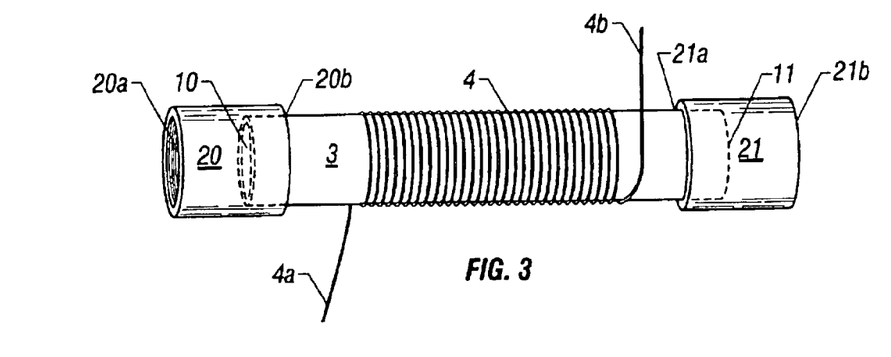
FIG. 3 depicts an arrangement of components that provide for magnetic treatment of a fluid column at a plurality of distinct points.

FIG. 3 depicts an arrangement of components that provide magnetic fluid treatment at a plurality of distinct points. Electrical conductor 4 is shown as an uninterrupted coil of electrical conductor encircling the outer surface of magnetically conductive conduit 3. Non-magnetic coupling devices 20 and 21 are shown connected to each end of magnetically conductive conduit 3. These non-magnetically conductive conduit segments allow for the fluid impervious, non-contiguous connection of conduit 3 with additional segments of conduit. The non-magnetic coupling devices promote the flow of fluid through the magnetically energized conduit and establish the flow of a fluid along a path extending through a first non-magnetically conductive inlet conduit segment, a magnetically energized conduit segment downstream of the inlet segment, and a second non-magnetically conductive outlet conduit segment downstream of the magnetically conductive conduit segment.

To generate an electromagnetic field, first conductor lead 4a of the continuous coil of wire may be connected to a first terminal of a power supply and second conductor lead 4b of the continuous wire coil may be connected to a second terminal of the power supply. When voltage is supplied to the continuous coil of wire, magnetically conductive conduit 3 absorbs the magnetic field generated by energized coil of wire 4.

A feed stream comprising a fluid column receptive to magnetic treatment may be introduced to inlet port 20a of first non-magnetic coupling device 20 to establish the flow of a fluid column through the instant invention and exposed to a first region of magnetic treatment as it flows through the first non-magnetically conductive conduit segment and into the magnetic field concentrated at inlet port 10 of conduit 3. The feedstock may then enter conduit 3 and flow past outlet port 20b of non-magnetically conductive conduit device 20 forming a fluid impervious connection with conduit 3.

The fluid column may then be exposed to a second region of magnetic treatment as it is directed along a path extending through and substantially orthogonal to each turn of electrical conductor 4 forming the energized coil of wire surrounding the outer surface of the conduit 3. The feed stream may then be directed to exit the conduit where it may then be exposed to a third region of magnetic treatment. As it flows past inlet port 21a of second non-magnetic coupling device 21, shown forming a fluid impervious connection with magnetically energized conduit 3, the fluid column may be directed to pass through the magnetic field concentrated at outlet port 11 of conduit 3. The fluid column may then be discharged from outlet port 21b of the second non-magnetically conductive conduit segment as a processed feed stream. Non-magnetically conductive inlet conduit segment 20 and non-magnetically conductive outlet conduit segment 21 may be utilized to make fluid impervious, non-contiguous connections of inlet port 10 and outlet port 11 with additional segments of conduit to promote the flow of fluid through magnetically energized conduit 3.

Figure 4:
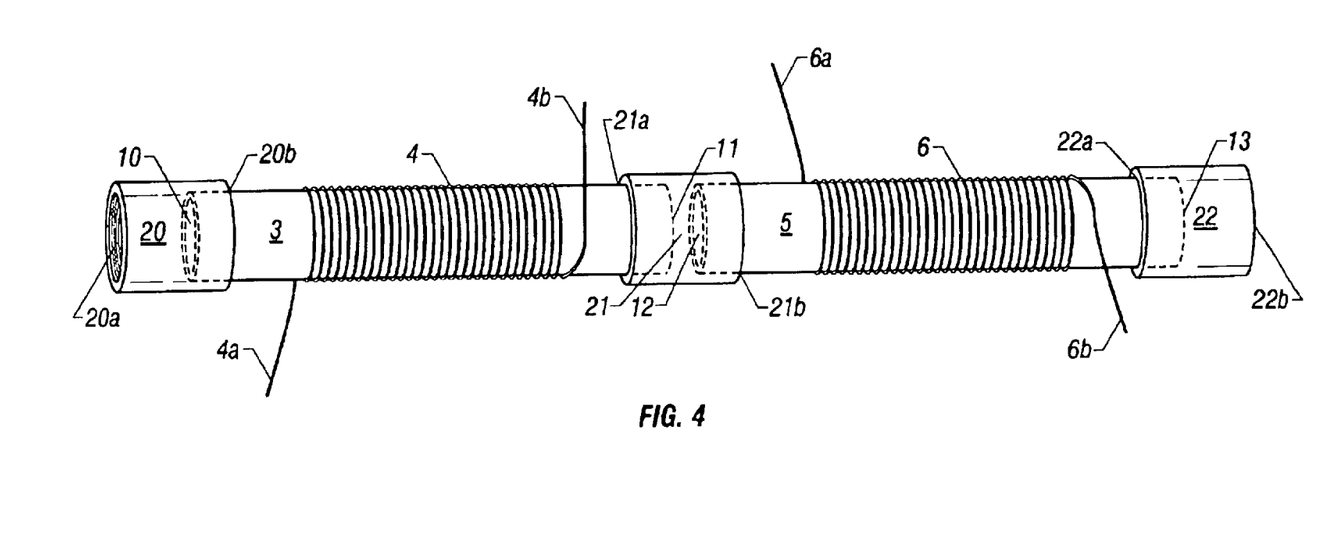
FIG. 4 depicts the connection of a first and a second electromagnetic field generator that provides for magnetic fluid treatment at a plurality of distinct points.

The utilization of a non-magnetic coupling device to make a non-contiguous connection between the outlet port of a first magnetically energized conduit and the inlet port of a second magnetically energized conduit has been shown to provide a distinct point of enhanced magnetic fluid treatment in the space between the conduits where their distinct magnetic fields are concentrated. The strength of the magnetic energy concentrated at this distinct point of enhanced magnetic fluid treatment is typically more than four times that concentrated at the end of a magnetically energized conduit having a fluid impervious, non-contiguous connection with a flanking segment of magnetically conductive conduit FIG. 4 depicts non-magnetic coupling device 21 making a fluid impervious, non-contiguous connection between a first length of conduit 3 and a second length of conduit 5. An uninterrupted coil of first electrical conductor 4 is shown encircling magnetically conductive conduit 3 and an uninterrupted coil of second electrical conductor 6 is shown encircling magnetically conductive conduit 5.

Enhanced magnetic treatment of a fluid column may be attained in the space between the non-contiguously connected magnetically energized conduits. A first electrical power supply may be used to energize electrical conductor 4 and a second electrical power supply may be used to energize electrical conductor 6. The coiled electrical conductors may also be connected in series and energized with a single electrical power supply. Second conductor lead 4b of the continuous wire coil of electrical conductor 4 may be connected in series with first conductor lead 6a of the continuous coil of electrical conductor 6. First conductor lead 4a of electrical conductor 4 may then be connected to a first terminal of a power supply and second conductor lead 6b of electrical conductor 6 may be connected to a second terminal of the power supply. When voltage is supplied to the now continuous coils of wire, the magnetic field generated by coiled electrical conductor 4 is absorbed by magnetically conductive conduit 3 and the magnetic field generated by coiled electrical conductor 6 is absorbed by magnetically conductive conduit 5.

The non-contiguous connection of magnetically energized conduits 3 and 5 via non-magnetically conductive conduit segment 21 provides for a distinct point of magnetic fluid treatment as the strength of the magnetic fields is concentrated in the space between outlet port 11 and inlet port 12. Typically, as the ends of the two magnetically energized conduits approach each other, the magnetic energy in the space between the non-contiguous conduits increases as a result of the attraction of the two energized conduits to one another and their magnetic fields being concentrated in a smaller area.

A feed stream comprising a fluid column receptive to magnetic treatment may be introduced to the inlet port 20a of first non-magnetic coupling device 20, shown forming a fluid impervious connection with conduit 3, to establish the flow of the fluid column through the instant invention. As the feed stream passes through the first non-magnetic coupling device and into the magnetic field concentrated at inlet port 10, it may be exposed to a first region of magnetic fluid treatment. The feed stream may then continue into conduit 3 and past outlet port 20b of the first non-magnetically conductive conduit segment. The fluid column may then be exposed to a second region of magnetic treatment as it is directed along a path extending through and substantially orthogonal to each turn of electrical conductor 4 forming the energized coil of wire surrounding the outer surface of the conduit 3. The feed stream may then be directed to exit conduit 3 and enter conduit 5 where it is then exposed to a third region of magnetic treatment in the space between the ends of the two conduits.

Non-magnetically conductive conduit segment 21 is shown making a fluid impervious, non-contiguous connection between magnetically energized conduits 3 and 5. As the fluid column flows past inlet port 21a, it is exposed to the enhanced magnetic treatment provided by the attraction of magnetically energized conduits 3 and 5 to each other. The strength of the magnetic fields concentrated in the space between outlet port 11 of conduit 3 and inlet port 12 of conduit 5 typically results this distinct point of magnetic fluid treatment having more than ten times the strength of the magnetic fields found within either of the energized coils of electrical conductor 4 or 6.

The feed stream may then continue to flow through inlet port 12 and into conduit 5 past outlet port 21b of second non-magnetic coupling device 2 connected to magnetically energized conduit 5. After passing through inlet port 12 of conduit 5, the fluid column may then be exposed to a fourth region of magnetic treatment as it is directed along a path extending through and substantially orthogonal to each turn of electrical conductor 6 forming the energized coil of wire surrounding the outer surface of the conduit 5.

The feed stream may then be directed to exit conduit 5 where it is exposed to a fifth region of magnetic treatment. After the fluid flows past inlet port 22a of third non-magnetic coupling device 22, shown forming a fluid impervious connection with magnetically energized conduit 5, it may then pass though the magnetic field concentrated at outlet port 13. The fluid column may then be discharged from outlet port 22b of third non-magnetically conductive conduit segment 22 as a processed feedstock. Non-magnetic coupling device 20 and non-magnetic coupling device 22 may be utilized to make fluid impervious, non-contiguous connections with flanking segments of conduit to promote the flow of fluid through the energized conduits.

The utilization of non-magnetically conductive conduit segments to make fluid impervious, non-contiguous connections between magnetically energized conduits 3 and 5 and additional segments of magnetically conductive conduit typically results in an increase in gauss strength at inlet port 10 and outlet port 13 due to the concentration of magnetic energy in the space between the non-contiguous conduits.

In some instances it may be desirable to enclose the electromagnetic field generator within a protective housing to shelter it from cuts, prolonged exposure to ultraviolet sunlight or other damage that may affect the structural integrity or performance of the device. A protective housing may include a pattern of perforations to allow for the flow-through ventilation of the unit and include a fan to promote the flow of air over the coiled electrical conductor, or the electromagnetic field generator of the instant invention may be sealed within a solid-bodied enclosure.

Figure 5:
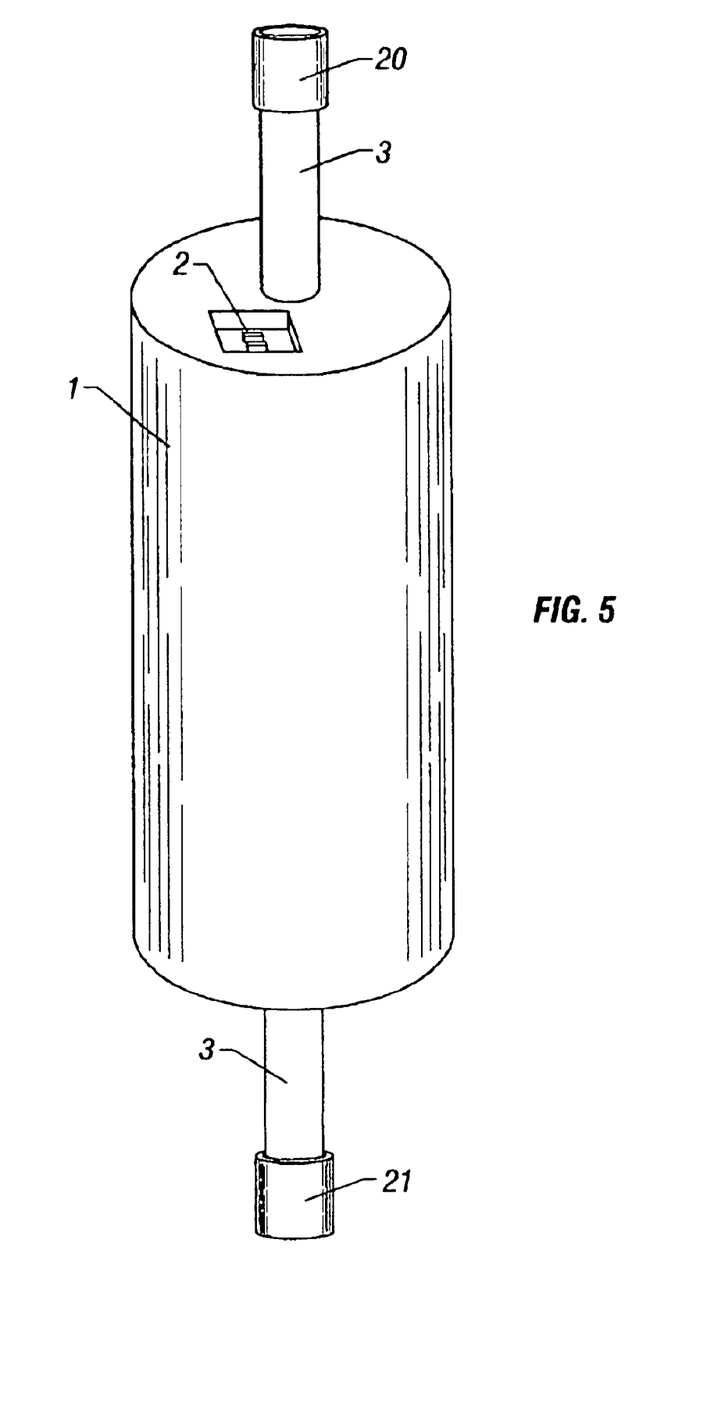
FIG. 5 illustrates an electromagnetic field generator enclosed within a cylindrical housing comprising a non-magnetic material.

FIG. 5 shows a length of magnetically conductive conduit 3 extending through each end of a cylindrical housing 1 utilized to protect the continuous wire coil encircling the conduit. Such housings are typically formed from a tubular member comprising a non-magnetic material and having a pair of non-magnetic end plates affixed to conduit 3. Non-magnetic coupling devices 20 and 21 are shown connected to each end of conduit 3 and allow the device to make fluid impervious, non-contiguous connections with additional segments of conduit. Junction box 2 shown at one end of housing 1 allows a source of electrical power to be connected to the electrical conductor forming the continuous coil of wire. Because the enclosure and the coupling devices are comprised of non-magnetic material, the magnetic flux is not captured, absorbed or contained within the housing or couplings. The magnetic flux loop is therefore free to flow as if through air and may concentrate at the ends of the magnetically energized conduit and allows a feed stream to be exposed to magnetic fluid treatment at a plurality of distinct points.

Figure 6:
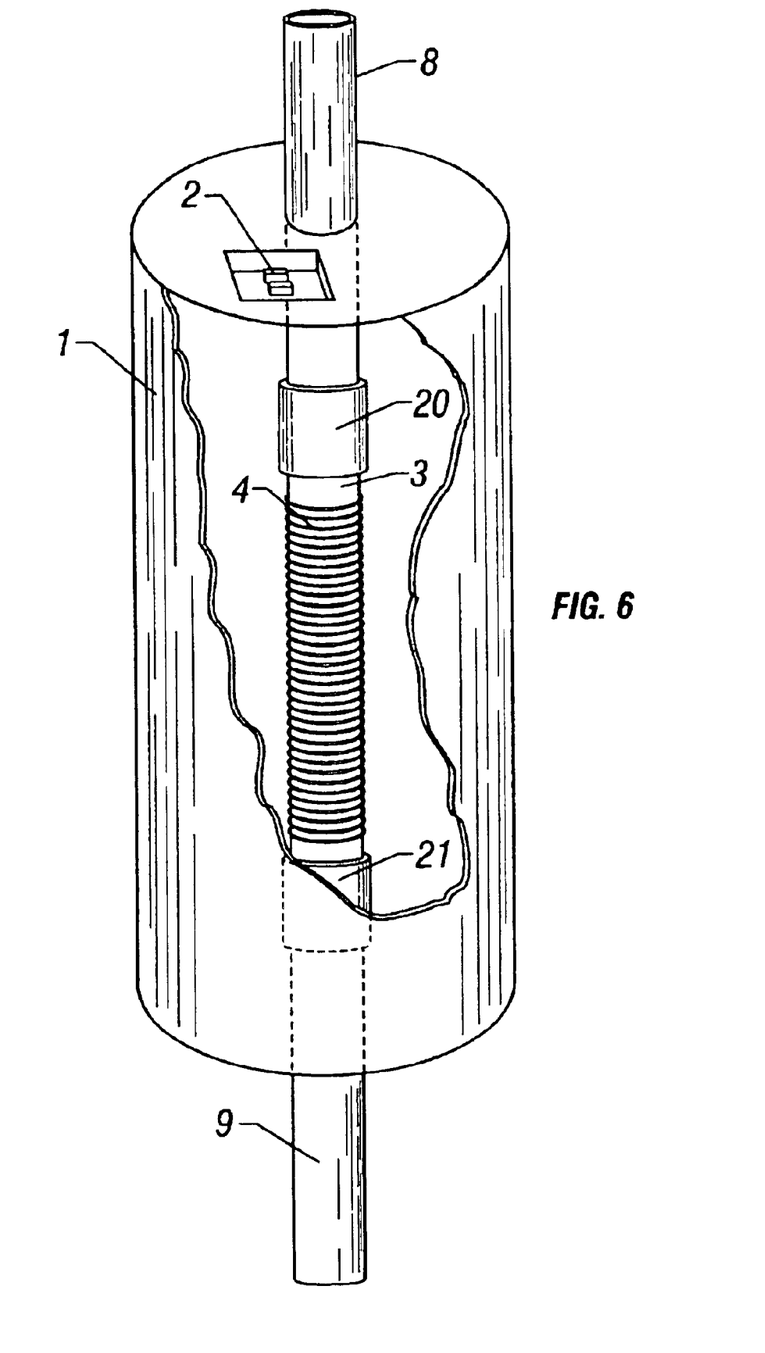
FIG. 6 illustrates an energized conduit, non-magnetic coupling devices and flanking segments of conduit enclosed within a housing comprising a magnetically conductive material.

FIG. 6 shows an electromagnetic field generator, having the capacity to provide magnetic fluid treatment at a plurality of distinct points, enclosed within a protective housing comprising a magnetically conductive material. In this configuration, non-magnetic coupling devices 20 and 21 are utilized within enclosure 1 to make fluid impervious, non-contiguous connections between magnetically energized conduit 3 and flanking lengths of non-energized magnetically conductive conduit 8 and 9. Flanking conduit segments 8 and 9 are shown extending through the end plates of cylindrical housing 1 utilized to protect wire coil 4 encircling conduit 3. Junction box 2 shown at one end of housing 1 allows a source of electrical power to be connected to the electrical conductor forming the continuous coil of wire 4. The end plates and tubular segment of cylindrical housing 1 typically comprise a similar magnetically conductive material to that comprising flanking conduit segments 8 and 9. This facilitates the attaching of the end plates to the flanking conduit segments and the outer tubular segment of the protective enclosure.

The magnetic flux loop of energized coil of wire 4 is contained within the magnetically conductive housing 1 and cannot flow outside the enclosure. Coupling devices 20 and 21 comprising a non-magnetic material establish non-magnetically conductive conduit segments that provide fluid impervious, non-contiguous connections between magnetically energized conduit 3 and flanking lengths of magnetically conductive conduit 8 and 9. The use of a non-magnetic material allows the magnetic flux loop of the coiled conductor 4 to pass through the fluid impervious boundary wall of the coupling devices and concentrate in the spaces between the magnetically energized conduit and the flanking segments of magnetically conductive conduit. Thus, magnetic fluid treatment may be provided at a plurality of distinct points within a magnetically conductive housing by utilizing non-magnetically conductive conduit segments to make non-contiguous connections between the inlet and outlet ports of a magnetically energized conduit and flanking segments of conduit.

The instant invention may be utilized to treat a wide variety of fluid columns to reduce the adhesive qualities of components in a feedstock. In oilfield applications, magnetic fluid treatment may be applied at the wellhead to reduce scale, paraffin and asphaltene deposits within the production piping system. Similar reductions in deposits may also be realized when treating large transmission pipelines. In collection tank batteries, magnetic fluid treatment may be used to reduce high tank bottoms, a term used to describe the accumulation of sediment within storage tanks that reduces the storage capacity of such vessels.

The heat generated by the instant invention may be advantageously applied to certain petroleum production applications. Introducing heat at the production interval of oil well operations provides a number of benefits, including a reduction in the viscosity of heavy oils and an increase in their mobility that allows them to migrate more freely through a formation and into a downhole wellbore. The instant invention may be configured to fit within a wellbore for use in downhole oilfield production applications and may also be utilized in concert with other types of downhole heating apparatus.

Figure 7:
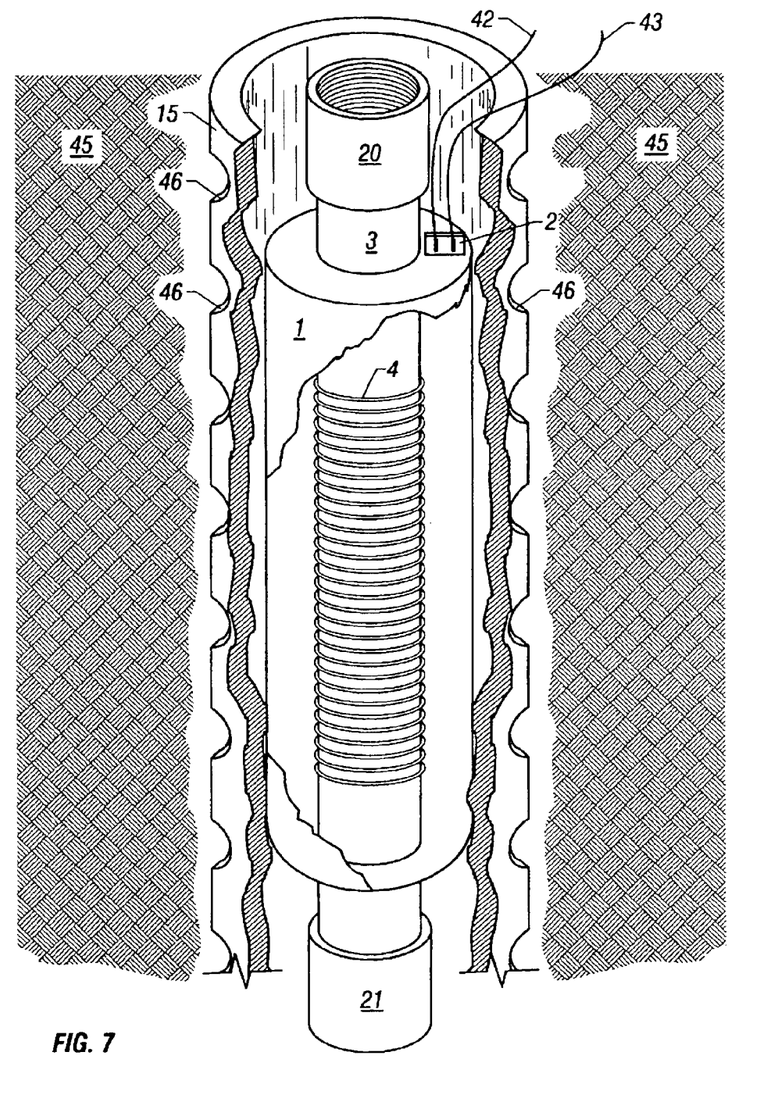
FIG. 7 shows an electromagnetic field generator placed downhole proximate a petroleum production formation.

FIG. 7 depicts an electromagnetic field generator having the capacity to provide magnetic fluid treatment at a plurality of distinct points adapted for placement within a wellbore proximate a petroleum production formation. Conduit 3 is shown extending through the end plates of protective housing 1. Electrical conductor 4 is shown encircling magnetically conductive conduit 3 and enclosed within solid-bodied cylindrical housing 1. Non-magnetic coupling devices 20 and 21 are shown connected to each end of conduit 3 and allow the device to make fluid, impervious, non-contiguous connections with additional segments of conduit. Electrical leads 42 and 43 provide voltage and current to power the device and are shown connected to junction box 2 on top of cylindrical housing 1.

Heat generated by energized electrical conductor coil 4 may be transferred to the body of enclosure 1 where it may then radiate into wellbore casing 15 and into the surrounding formation 45. Heat generated by the coiled electrical conductor allows petroleum and other fluids within the surrounding formation 45 to migrate more freely and enter wellbore-casing 15 via a pattern of perforations 46. Petroleum and other fluids in the formation may then enter a segment of conduit below non-magnetic coupling device 21 and flow through the device to the surface for collection and processing.

A power supply may be located on the surface near the wellhead, with power leads run downhole to provide the required voltage and current to drive the device. When an electric submersible pump is utilized, the device may be powered by the same power source as the pump. The transfer of heat from the coil of wire to the adjacent formation improves the migration of petroleum and other fluids into the wellbore Further, the downhole utilization of magnetic fluid treatment assists in the production of petroleum-based fluids by reducing the surface tension of components within a fluid column, decreasing their adhesive properties and inhibiting their accumulation as deposits within the walls of production tubing and on equipment utilized in the transfer of the fluid to the surface. Thus, downhole magnetic fluid treatment may increase the efficiency of pumps and other fluid lifting apparatus.

Electromagnetic treatment may also be utilized in water conditioning. For example, the installation of the instant invention on the main water supply line of a residence may prevent the formation of scale within the piping system of the home. The effects of magnetic water treatment may significantly improve the efficiency of many appliances such as water heaters, washing machines, dishwashers and coffee makers. In regions having hard water supplies, a term used to describe water having a relatively high mineral content, magnetic water treatment provides for a significant reduction in the surface tension of such water columns. Magnetic treatment to reduce the surface tension of hard water typically results in smaller amounts of soaps or detergents being used to obtain the cleaning results that are often achieved with untreated hard water.

Similar benefits may be realized in commercial and industrial heat exchange equipment. In cooling towers, boilers and other types of heat exchangers, scale deposits may inhibit the transfer of heat carried by water to the surfaces of heat transfer equipment. Scale deposits not only form an insulating barrier that tends to reduce the efficiency of heat transfer equipment but also result in restricted flow and increased energy consumption in heat exchange systems. Magnetic water treatment prevents the formation of scale deposits that inhibit the transfer of heat in such systems. Further, the residual effects of magnetic treatment typically result in the softening of existing scale and other deposits, allowing them to disperse into a water column. A magnetically treated fluid column may be directed through separation or clarification apparatus to remove the suspended scale and other deposits from the water column, then to subsequent treatment phases, if necessary, to extract any remaining contaminants.

While chemical treatment has long been practiced to eliminate biological contaminants such as algae and bacteria in heat exchange systems, magnetic fluid treatment may also eradicate many such contaminants. Electromagnetic forces provided by the instant invention alter the functions of the cell membranes of organisms and typically cause the membranes and cell walls of many biological contaminants to collapse, providing an efficient means of biological contaminant destruction. Many biological contaminants regulate their water intake through osmosis via the electrical charge of fats and proteins in their surface membranes. Exposing feedstocks containing biological contaminants to concentrated magnetic fields drives the surface membranes of many biological contaminants to an imbalanced state by overwhelming the electrical field and the charge of the organism, thereby collapsing the cell walls and destroying the membranes. Utilization of the instant invention may be of particular utility in the destruction and elimination of many microorganisms because, unlike chemical treatment and many other means of dealing with such contaminants, bacteria and other organisms cannot develop immunity to such treatment. However, additional treatment may be required to control algae and bacteria in processes that constantly circulate the same volume of water through a system.

A traditional method of controlling algae has been the use of copper sulfate, commonly called bluestone. Copper sulfate in both crystalline and liquid forms has been used as an algaecide in water supply reservoirs for years with fair to mixed results. Large quantities of bluestone are typically required to achieve a sufficient concentration of dissolved copper sulfate to control algae. It is labor intensive, and therefore very costly to use. Effective long-term algae control is difficult because the copper quickly settles and often requires further applications. However, there is an effective alternative. A safe, simple and quick method of providing potable-quality water utilizes an algaecide/bactericide in conjunction with magnetic water treatment.

A fully dissolving liquid copper sulfate chelate offers significant improvements over other copper based products and has many advantages over bluestone and other liquid algaecides. The copper chelate self-disperses both horizontally and vertically throughout a water column, allowing copper concentrations to be easily and accurately measured and thereby providing for correct treatment rates of targeted species of algae and bacteria. Pre-treatment with a liquid copper chelate prevents the spread of algae before it can begin to bloom. Long-term control is possible without constant application, thereby relieving concerns of the contamination of sediments due to the extended use of copper.

A liquid copper chelate commonly available under the trade name of SCI-62 is registered as an algaecide/bactericide with the U.S. EPA, and certified to ANSI-NSF Standard 60 as a drinking water additive. This copper chelate provides an environmentally responsible water treatment that is non-toxic to humans and fish when used as directed. It provides long-term control without overtreatment and reduces trihalomethane (THM) precursors, shortens filter runs by reducing the turbidity caused by organic contaminants and reduces planktonic algae and bacteria that cause disease, bad taste and odors. In contrast to prior art methods of controlling algae and biological contaminants that typically result in chemical laden water requiring additional treatment to make it suitable for discharge into the environment, magnetic fluid treatment combined with the use of this liquid copper chelate results in the blowdown of boilers and cooling towers being acceptable for direct discharge into the environment. Thus, the instant invention eliminates the substantial surcharge incurred for the discharge of chemically treated blowdown into a municipal wastewater disposal system and does away with the costly storage, handling and dispensing of dangerous chemicals.

While a fundamental use of magnetic treatment may be to loosen and eliminate scale and other deposits from a piping system, it may also be utilized to overcome the forces that cause emulsions and accelerate the separation of oil and water. Oil, having a lower specific gravity, typically floats on water. However, mechanical agitation may shear the interface of distinct layers of oil floating on water so that small oil droplets become dispersed in water. These small oil droplets tend to coalesce, form larger droplets and eventually float out of suspension. However, when exposed to surfactants or other chemical agents, a tin layer of such chemicals typically coats the surfaces of the oil droplets, causing them to polarize and repel each other.

These small oil droplets remain suspended within the water and result in a substantial surface area of oil being dispersed within a water column. This increases the tendency of the oil to form a stable emulsion. Under the influence of magnetic fluid treatment, forces bonding the surfactant to the surface of the oil droplets and providing the repelling surface charges are reduced. Diminishing the electrostatic charges on the surface of the oil droplets allows previously stable emulsions to break so that the small oil droplets are free to coalesce into larger droplets and float out of the water column. The free-floating oil may then be removed by conventional oil/water separation equipment. Thus, safe, simple, chemical-free pretreatment for hydrocarbon contaminated fluid columns enhances the efficiency of oil/water separation devices.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments that fall within the scope of the invention.

What is claimed is:

1. A method of providing magnetic fluid treatment at a plurality of distinct points, comprising the steps of:

providing a first and a second length of conduit, each conduit comprising a magnetically conductive material defining a fluid impervious boundary wall with an inner surface and an outer surface and having a fluid entry port at one end of the conduit and a fluid discharge port at the other end of the conduit;

providing a first and a second length of an electrical conductor, each electrical conductor having a first conductor lead and a second conductor lead;

providing a first, a second and a third coupling device, each coupling device establishing a non-magnetically conductive conduit segment comprising a non-magnetic material defining a fluid impervious boundary wall with an inner surface and an outer surface and having inlet and outlet ports, the inner surface of said inlet and outlet ports adapted to receive a segment of conduit;

coiling the first electrical conductor around the outer surface of the first magnetically conductive conduit to form a first uninterrupted coil of electrical conductor encircling the first magnetically conductive conduit;

coiling the second electrical conductor around the outer surface of the second magnetically conductive conduit to form a second uninterrupted coil of electrical conductor encircling the second magnetically conductive conduit;

connecting the outlet port of the first non-magnetic coupling device to the inlet port of the first magnetically conductive conduit;

connecting the outlet port of the first magnetically conductive conduit to the inlet port of the second non-magnetic coupling device;

connecting the outlet port of the second non-magnetic coupling device to the inlet port of the second magnetically conductive conduit, said union providing a fluid impervious, non-contiguous connection between the outlet port of the first magnetically conductive conduit and the inlet port of the second magnetically conductive conduit; and connecting the outlet port of the second magnetically conductive conduit to the inlet port of the third non-magnetic coupling device.

2. The method of claim 1 further comprising the steps of:

connecting the first and second conductor leads of the first electrical conductor coiled around the outer surface of the first magnetically conductive conduit to a first electrical power supply to produce an electromagnetic field within the inner surface of the fluid impervious boundary wall of the first magnetically conductive conduit, said magnetic field extending beyond each end of the first magnetically conductive conduit along the longitudinal axis of the first magnetically conductive conduit;

connecting the first and second conductor leads of the second electrical conductor coiled around the outer surface of the second magnetically conductive conduit to a second electrical power supply to produce an electromagnetic field within the inner surface of the fluid impervious boundary wall of the second magnetically conductive conduit, said magnetic field extending beyond each end of the second magnetically conductive conduit along the longitudinal axis of the second magnetically conductive conduit;

introducing a feed stream comprising a fluid column receptive to magnetic treatment to the inlet port of the first non-magnetic coupling device to establish a flow of the fluid column through the connected lengths of conduit;

directing the flow entering the first magnetically conductive conduit to pass through a first area of magnetic treatment concentrated at the inlet port of the first magnetically conductive conduit;

directing the flow discharged from the inlet port of the first magnetically conductive conduit to pass through a second area of magnetic treatment concentrated along a path extending through and substantially orthogonal to each turn of the electrical conductor forming the first coil surrounding the outer surface of the first magnetically conductive conduit;

directing the flow exiting the first magnetically conductive conduit to pass through a third area of magnetic treatment concentrated in the space between the outlet port of the first magnetically conductive conduit and the inlet port of the second magnetically conductive conduit;

directing the flow discharged from the inlet port of the second magnetically conductive conduit to pass through a fourth area of magnetic treatment concentrated along a path extending through and substantially orthogonal to each turn of the electrical conductor forming the second coil surrounding the outer surface of the second magnetically conductive conduit;

directing the flow exiting the second magnetically conductive conduit to pass through a fifth area of magnetic treatment concentrated at the outlet port of second magnetically conductive conduit; and discharging the fluid exiting from the outlet port of the third non-magnetic coupling device as a processed feed stream.

3. The method of claim 1 wherein the first electrical conductor coil encircling the first magnetically conductive conduit induces a magnetic field to which fluid passing through the first magnetically conductive conduit is exposed.

4. The method of claim 1 wherein the second electrical conductor coil encircling the second magnetically conductive conduit induces a magnetic field to which fluid passing through the second magnetically conductive conduit is exposed.

5. The method of claim 1 wherein the magnetic field concentrated in the fluid impervious, non-contiguous connection between the outlet port of the first magnetically conductive conduit and the inlet port of the second magnetically conductive conduit is greater than the magnetic field concentrated at the inlet port of the first magnetically conductive conduit and the magnetic field concentrated at the outlet port of the second magnetically conductive conduit.

6. The method of claim 1 wherein the supplies of electrical power are of sufficient magnitude to induce magnetic fields to fluid passing through the magnetically conductive conduits.

7. An apparatus for of providing magnetic fluid treatment at a plurality of distinct points comprising:

a first and a second length of conduit, each conduit comprising a magnetically conductive material defining a fluid impervious boundary wall with an inner surface and an outer surface and having a fluid entry port at one end of the conduit and a fluid discharge port at the other end of the conduit;

a first, a second and a third coupling device, each coupling device establishing a non-magnetically conductive conduit segment comprising a non-magnetic material defining a fluid impervious boundary wall with an inner surface and an outer surface and having inlet and outlet ports, the inner surface of said inlet and outlet ports adapted to provide for the fluid impervious, non-contiguous connection between a magnetically conductive conduit and an additional segment of conduit;

a first electrical conductor coiled around a segment of the first magnetically conductive conduit to form a first uninterrupted coil of electrical conductor encircling the first magnetically conductive conduit;

a second electrical conductor coiled around a segment of the second magnetically conductive conduit to form a second uninterrupted coil of electrical conductor encircling the second magnetically conductive conduit;

a first electrical power supply having a capacity to energize the first coiled electrical conductor and produce an electromagnetic field within the inner surface of the fluid impervious boundary wall of the first magnetically conductive conduit, the magnetic field of the first coil of wire extending beyond each end of the first magnetically energized conduit substantially parallel to the longitudinal axis of the first magnetically conductive conduit; and a second electrical power supply having a capacity to energize the second coiled electrical conductor and an produce electromagnetic field within the inner surface of the fluid impervious boundary wall of the second magnetically conductive conduit, the magnetic field of the second coil of wire extending beyond each end of the second magnetically energized conduit substantially parallel to the longitudinal axis of the second magnetically conductive conduit.

8. The apparatus of claim 7 wherein the first and second electrical conductors each comprise a continuous strand of electrical conducting material having a first conductor lead and a second conductor lead.

9. The apparatus of claim 7 wherein each turn of the first electrical conductor coiled around a segment of the first magnetically conductive conduit forms a first uninterrupted coil.

10. The apparatus of claim 7 wherein each turn of the second electrical conductor coiled around a segment of the second magnetically conductive conduit to forms a second uninterrupted coil.

11. The method of claim 7 wherein the first and second conductor leads of the first electrical conductor are connected to a first electrical power supply and the first and second conductor leads of the second electrical conductor are connected to a second electrical power supply.

12. The apparatus of claim 7 wherein the outlet port of the first non-magnetic coupling device is connected to the inlet port of the first magnetically conductive conduit to establish a non-magnetically conductive inlet conduit segment.

13. The apparatus of claim 7 wherein the inlet port of the second non-magnetic coupling device is connected to the outlet port of the first magnetically conductive conduit.

14. The apparatus of claim 7 wherein the outlet port of the second non-magnetic coupling device is connected to the inlet port of the second magnetically conductive conduit to provide a fluid impervious, non-contiguous connection between the outlet port of the first magnetically conductive conduit and the inlet port of the second magnetically conductive conduit.

15. The apparatus of claim 7 wherein the inlet port of the third non-magnetic coupling device is connected to the outlet port of the second magnetically conductive conduit to establish a non-magnetically conductive outlet conduit segment.

16. The apparatus of claim 7 wherein the first and third non-magnetic coupling devices provide for the fluid impervious, non-contiguous connection of a first additional segment of conduit with the inlet port of the first magnetically energized conduit and a second additional segment of conduit with the outlet port of the second magnetically energized conduit to promote the flow of fluid through the magnetically energized conduits.

17. The apparatus of claim 7 wherein the non-contiguous connection of a first additional segment of conduit comprising a magnetically conductive material with the inlet port of the first magnetically energized conduit provides for a concentration of magnetic energy in the space between the inlet port of the first magnetically energized conduit and the first magnetically conductive conduit segment and the connection of a second additional segment of conduit comprising a magnetically conductive material with the outlet port of the second magnetically energized conduit provides for a concentration of magnetic energy in the space between the outlet port of the second magnetically energized conduit and the second magnetically conductive conduit segment.

18. The apparatus of claim 7 further comprising a protective housing enclosing the first coiled electrical conductor, the second non-magnetic coupling device and the second coiled electrical conductor.

19. The apparatus of claim 18 wherein the protective housing comprises a tubular member having a first end plate affixed to the first magnetically energized conduit and a second end plate affixed to the second magnetically energized conduit.

20. The apparatus of claim 18 wherein the protective housing is made of a non-magnetic material.

21. The apparatus of claim 18 wherein the protective housing is made of a magnetic material.

22. The apparatus of claim 7 further comprising a protective housing enclosing the first non-magnetic coupling device, the first coiled electrical conductor encircling a segment of the first length of magnetically conductive conduit, the second non-magnetic coupling device, the second coiled electrical conductor encircling a segment of the second length of magnetically conductive conduit and the third non-magnetic coupling device.

23. The apparatus of claim 22 wherein the protective housing comprises a tubular member having a first end plate affixed to a first additional segment of conduit connected to the inlet port of the first magnetically energized conduit via the first non-magnetic coupling device and a second end plate affixed to a second additional segment of conduit connected to the outlet port of the second magnetically energized conduit via the third non-magnetic coupling devices.

24. The apparatus of claim 22 wherein the protective housing is made of a magnetically conductive material.

25. The apparatus of claim 22 wherein the protective housing is made of a non-magnetically conductive material.

26. The apparatus of claim 7 wherein a segment of conduit within a piping system comprising a non-magnetically conductive material is sleeved by the first non-magnetic coupling device, the first magnetically energized conduit, the second non-magnetic coupling device, the second magnetically energized conduit and the third non-magnetic coupling device.

27. The apparatus of claim 26 wherein the non-magnetically conductive conduit promotes the flow of fluid through a plurality of distinct points of magnetic fluid treatment.

28. A method of treating a fluid, comprising the steps of:
establishing the flow of a fluid to be treated along a path extending through a first non-magnetically conductive inlet conduit segment, a first magnetically conductive conduit segment downstream of the inlet segment, a second non-magnetically conductive coupling conduit segment downstream of the first magnetically conductive conduit segment, a second magnetically conductive conduit segment downstream of the coupling segment and a third non-magnetically conductive outlet conduit segment downstream of the second magnetically conductive conduit segment; and
establishing magnetic fields having lines of flux directed along the flow path of the fluid and concentrated within the inlet conduit segment, within the first magnetically conductive conduit segment, within the coupling conduit segment, within the second magnetically conductive conduit segment and within the outlet conduit segment.

29. An apparatus for treating a fluid, comprising:
a conduit to receive a flow of a fluid to be treated, the conduit having a first non-magnetically conductive inlet conduit segment, a first magnetically conductive conduit segment downstream of the inlet segment, a second non-magnetically conductive coupling conduit segment downstream of the first magnetically conductive conduit segment, a second magnetically conductive conduit segment downstream of the coupling segment and a third non-magnetically conductive outlet conduit segment downstream of the second magnetically conductive conduit segment;
a first electrical conductor coiled around the first magnetically conductive conduit segment of said conduit with the coils oriented substantially orthogonal to the fluid flow, the first coiled conductor forming an electromagnet establishing a magnetic field having lines of flux directed along the flow path of the fluid and concentrated within the inlet conduit segment, within the first magnetically conductive conduit segment, and within the coupling conduit segment;
a second electrical conductor coiled around the second magnetically conductive conduit segment of said conduit with the coils oriented substantially orthogonal to the fluid flow, the second coiled conductor forming an electromagnet establishing a magnetic field having lines of flux directed along the flow path of the fluid and concentrated within the coupling conduit segment, within the second magnetically conductive conduit segment, and within the outlet conduit segment; and
a supply of electrical power coupled to the coiled electrical conductors to energize the electromagnets and produce the magnetic fields.

30. The apparatus of claim 29 wherein the lines of flux form loops and the magnetic fields are of a strength that allows the flux to extend along the longitudinal axis of the magnetically conductive conduit segments and concentrate at distinct points beyond each end of the magnetically conductive conduits such that the magnetic flux loops extend from a point where the lines of flux concentrate beyond one end of a magnetically conductive conduit segment, around the periphery of the coiled conductor along the longitudinal axis of the magnetically conductive conduit segment, and to a point where the lines of flux concentrate beyond the other end of the magnetically conductive conduit segment.

31. The apparatus of claim 29 wherein the magnetically conductive conduit segments absorb the magnetic fields and the magnetic flux loops generated by the coiled conductors at the points of flux concentration.

32. The apparatus of claim 29 wherein a segment of conduit within a piping system comprising a non-magnetically conductive material is sleeved by the conduit comprising a non-magnetically conductive inlet conduit segment, a first magnetically conductive conduit segment, a non-magnetically conductive coupling conduit segment, a second magnetically conductive conduit segment and a non-magnetically conductive outlet conduit segment.

33. The apparatus of claim 32 wherein the non-magnetically conductive conduit promotes the flow of fluid through a plurality of distinct points of magnetic fluid treatment.

* * * * *

UNITED STATES PATENT AND TRADEMARK OFFICE
CERTIFICATE OF CORRECTION

| | | |
|---|---|---|
| PATENT NO. | : 6,852,235 B2 | Page 1 of 1 |
| APPLICATION NO. | : 10/731398 | |
| DATED | : February 8, 2005 | |
| INVENTOR(S) | : Holland | |

It is certified that error appears in the above-identified patent and that said Letters Patent is hereby corrected as shown below:

On the title page ITEM (63) please delete FEB. 23, 2002 and insert FEB. 23, 2003

Signed and Sealed this

Seventeenth Day of October, 2006

JON W. DUDAS
*Director of the United States Patent and Trademark Office*